(12) United States Patent
Muñoz Guijosa et al.

(10) Patent No.: US 12,233,387 B2
(45) Date of Patent: Feb. 25, 2025

(54) METHOD AND SYSTEM FOR THE TREATMENT OF MATERIALS

(71) Applicant: UNIVERSIDAD POLITECNICA DE MADRID, Madrid (ES)

(72) Inventors: Juan Manuel Muñoz Guijosa, Madrid (ES); Guillermo Fernández Zapico, Madrid (ES)

(73) Assignee: UNIVERSIDAD POLITECNICA DE MADRID, Madrid (ES)

( * ) Notice: Subject to any disclaimer, the term of this patent is extended or adjusted under 35 U.S.C. 154(b) by 888 days.

(21) Appl. No.: 17/295,157

(22) PCT Filed: Nov. 19, 2019

(86) PCT No.: PCT/ES2019/070789
§ 371 (c)(1),
(2) Date: May 19, 2021

(87) PCT Pub. No.: WO2020/104721
PCT Pub. Date: May 28, 2020

(65) Prior Publication Data
US 2022/0008875 A1 Jan. 13, 2022

(30) Foreign Application Priority Data
Nov. 20, 2018 (ES) .............................. ES201831123

(51) Int. Cl.
*B01F 7/00* (2006.01)
*B01F 3/12* (2006.01)
(Continued)

(52) U.S. Cl.
CPC ............ *B01F 27/276* (2022.01); *B01F 23/53* (2022.01); *B01F 23/551* (2022.01); *B01F 31/44* (2022.01);
(Continued)

(58) Field of Classification Search
CPC . B02C 2015/126; B02C 15/12; B02C 15/123; B01F 27/276
See application file for complete search history.

(56) References Cited

U.S. PATENT DOCUMENTS 537,947 A * 4/1895 Tornaghi
1,401,716 A 12/1921 McCray
(Continued)

FOREIGN PATENT DOCUMENTS

| CH | 480 088 A | 10/1969 |
|---|---|---|
| DE | 660 721 C | 6/1938 |

(Continued)

OTHER PUBLICATIONS

International Search Report and Written Opinion, PCT/ES2019/070789 (Feb. 10, 2020).
(Continued)

*Primary Examiner* — Elizabeth Insler
(74) *Attorney, Agent, or Firm* — Jayne Saydah (57) ABSTRACT

A system for the treatment of materials, to be selected from between materials in a fluid state (1) and particles suspended in a fluid material (1), comprising at least one upper kinematic pair equipped with two mechanical elements (2a, 2b; 2a, 2c), said kinematic pair being in contact with a material in a fluid state (1) or with particles suspended in a fluid material (1); motor means (5) to generate a pre-set relative velocity (v) between the elements (2a, 2b; 2a, 2c) of said kinematic pair, and tensioning means (8) to subject said kinematic pair to a pre-set pressure (P).

11 Claims, 5 Drawing Sheets

(51) Int. Cl.
  *B01F 11/00*   (2006.01)
  *B01F 15/06*   (2006.01)
  *B01F 23/50*   (2022.01)
  *B01F 23/53*   (2022.01)
  *B01F 27/27*   (2022.01)
  *B01F 31/44*   (2022.01)
  *B01F 35/32*   (2022.01)
  *B01F 35/92*   (2022.01)
  *B01J 8/18*    (2006.01)
  *B01F 35/30*       (2022.01)
  *B01F 101/00*      (2022.01)
  *B01F 101/30*      (2022.01)

(52) U.S. Cl.
  CPC .......... *B01F 35/3204* (2022.01); *B01F 35/92* (2022.01); *B01J 8/1836* (2013.01); *B01F 2035/351* (2022.01); *B01F 2101/2805* (2022.01); *B01F 2101/30* (2022.01); *B01J 2208/00203* (2013.01); *B01J 2208/00858* (2013.01)

(56) References Cited

U.S. PATENT DOCUMENTS

| | | | | |
|---|---|---|---|---|
| 2,115,314 | A | | 4/1938 | McErlean et al. |
| 2,204,140 | A | * | 6/1940 | Langbein .............. B02C 15/123 |
| | | | | 241/105 |
| 2,432,610 | A | * | 12/1947 | Dryer ..................... B02C 15/12 |
| | | | | 241/105 |
| 3,286,937 | A | | 11/1966 | Laszlo |
| 3,375,982 | A | * | 4/1968 | Lease ..................... B02C 15/12 |
| | | | | 241/173 |
| 5,129,728 | A | * | 7/1992 | Winstead ............... B29B 7/823 |
| | | | | 366/97 |
| 2006/0106147 | A1 | | 5/2006 | Fasulo et al. |
| 2010/0009165 | A1 | | 1/2010 | Patel et al. |
| 2015/0010456 | A1 | | 1/2015 | Kurakijun et al. |

FOREIGN PATENT DOCUMENTS

| | | |
|---|---|---|
| EP | 2 075 072 A1 | 7/2009 |
| EP | 3235877 A1 | 10/2017 |
| ES | 2440766 T3 | 1/2014 |
| GB | 235 227 A | 8/1925 |
| GB | 1 345 531 A | 1/1974 |
| SU | 1 095 977 A1 | 6/1984 |
| SU | 1 449 155 A1 | 1/1989 |

OTHER PUBLICATIONS

Spanish Search Report, App. No. 201831123 (Jul. 31, 2019).
European Supplementary Search Report, App. No. 19888053 (Mar. 24, 2022).

* cited by examiner

METHOD AND SYSTEM FOR THE TREATMENT OF MATERIALS

CROSS-REFERENCE

This application is the U.S. National Stage of International Application No. PCT/ES2019/070789 filed on Nov. 19, 2019, which claims the benefit of priority from Spanish Patent application No. P201831123 filed on Nov. 18, 2020, the contents of which are both herein incorporated by reference in their entirety.

BACKGROUND OF THE INVENTION

Field of the Invention

The present invention is applicable to industrial processes intended for improving the properties of materials, for example and in a non-limiting manner, polymer materials.

More particularly, the present invention relates to a method and system for the treatment of materials, said materials being selected from between materials in a fluid state and particles suspended in a fluid material, by means of the application of high shear rates and/or hydrostatic pressures, allowing the physical, chemical, and/or mechanical properties of said materials or other materials derived therefrom (for example, following polymerisation) to be improved without the need to add reinforcement particles or other similar improvement elements to that end.

Likewise, a particular embodiment of the present invention relates to a mixing method for mixing a material in a fluid state with particles suspended in said fluid material at high shear rates and/or hydrostatic pressures. Said embodiment is applicable, for example and in a non-limiting manner, to processes for manufacturing paint, as well as to processes for manufacturing materials that are improved/reinforced by means of particles and nanoparticles, and to processes for obtaining said particles and nanoparticles.

The embodiments of the invention allow obtaining shear rates and hydrostatic pressures that are significantly higher than those contemplated in the state of the art by about two orders of magnitude, even three orders of magnitude in some cases.

Description of Related Art

In some processes for manufacturing materials, reinforcement particles are often added to said material when it is in a fluid state to improve its physical, chemical, and/or structural properties.

Said materials may preferably comprise a matrix of starting material, for example and in a non-limiting manner, a polymer material, such as an epoxy resin or a polycarbonate.

The resulting mixture, formed by the material in a fluid state and the reinforcement particles, then usually solidifies by means of processes such as polymerisation, sintering, cooling, etc. The materials obtained as a result of said mixing and subsequent solidification process are usually called "composites".

Nevertheless, the addition of these reinforcement particles complicates the process of manufacturing the material and increases production costs. Therefore, it would be desirable to develop systems and methods for the treatment of materials in a fluid state which allow the physical, chemical, and/or structural properties of said materials to be improved without the need to add reinforcement and/or improvement particles to that end.

By way of example and in a non-limiting manner, it is known that the addition of carbon nanotubes and/or graphene or graphene oxide nanoparticles to epoxy resin or polycarbonate matrices as reinforcement particles improves, among others, the following physical and/or structural properties: fracture energy, fatigue life, rigidity, tensile strength, thermal conductivity, and electrical conductivity. The materials obtained as a result of said mixing and subsequent solidification process are called "nanocomposites" (given that the reinforcement particles in this particular case are nanoparticles).

Moreover, it is known that the degree by which the properties of the materials comprising polymer materials are improved by means of the addition of reinforcement particles, such as carbon nanotubes and/or graphene or graphene oxide nanoparticles, depends largely on the following factors: the level of delamination of the reinforcement particles, the level of dispersion of the reinforcement particles, and the quality of the interfaces generated between the reinforcement particles and the polymer material.

The reinforcement particles mentioned in the preceding paragraph, particularly flat nanoparticles such as graphene, are often formed by stacks of several different sheets. The more the sheets are separated from one another (i.e., the higher the level of delamination), the better the properties of the resulting nanocomposite material will be. The same occurs with linear nanoparticles such as carbon nanotubes, given that they tend to entangle with one another. The more the linear nanoparticles are separated from one another (i.e., the higher the level of disentanglement), the better the properties of the resulting material will be.

In the state of the art, the mixture, formed in this case by the polymer material in a fluid state and the suspended reinforcement particles, is often subjected to high shear rates to increase the level of delamination or disentanglement of the reinforcement particles. Therefore, for example, by using a Rannie Gaulin 110T homogeniser marketed by AXFlow Holding AB, shear rates of the order of $10^5$ s$^{-1}$ can be obtained. At these shear rates, many of the sheets originally present in the reinforcement particles are delaminated, but not completely.

The same method based on the application of high shear rates is used to obtain graphene sheets from the delamination of graphite. In this case, the fluid material is a solvent in which graphite particles are suspended. The shear rates that can be obtained with the current systems do not allow completely delaminating all the graphene sheets forming the graphite particles.

It would therefore be desirable to develop new mixing methods for mixing reinforcement particles with materials in a fluid state, whereby higher shear rates can be obtained.

Moreover, the level of delamination or disentanglement of the reinforcement particles would also improve by increasing the hydrostatic pressure to which the mixture is subjected.

Rannie Gaulin 110T homogenisers available today, marketed by AXFlow Holding AB, are capable of applying hydrostatic pressures of the order of 0.15 GPa on the mixtures. It would therefore be advisable to develop new mixing methods for mixing reinforcement particles with materials in a fluid state, whereby higher hydrostatic pressures can be applied on the mixture formed by the material in a fluid state and the reinforcement particles.

Likewise, some reinforcement and/or improvement particles tend to cluster together once they have been added to the liquid matrix of starting material.

As seen above, the lower the agglomeration of the reinforcement and/or improvement particles (i.e., the higher the level of dispersion), the better the properties of the resulting material will be. In the state of the art, the mixture is often subjected to high shear rates to reduce the agglomeration of the reinforcement and/or improvement particles.

Therefore, it would also be desirable to be able to obtain higher shear rates, for the purpose of achieving a higher degree of dispersion of the reinforcement and/or improvement particles.

Sometimes, in materials comprising a matrix of starting material, the reinforcement/improvement particles and said matrix of starting material do not adhere well to one another, giving rise to the generated interfaces not having a good quality. There may be various causes, for example, the lack of chemical compatibility between the materials forming the reinforcement/improvement particles and the starting material of the matrix.

Different techniques for improving the adhesion between the reinforcement particles and the matrix of starting material such as, for example, functionalisation, are known in the state of the art. Said technique consists of physically or chemically modifying the particles to improve the binding thereof to the atomic or molecular structure of the matrix. However, functionalisation is associated with several drawbacks, such as the appearance of defects in the reinforcement particles. This may cause the improvement of the properties of the composite material, which are associated with the improvement in the quality of the interface, to be partially cancelled due to the appearance of defects.

Another way of improving the adhesion of the particles to the matrix which does not present the drawbacks associated with functionalisation is to increase the shear rate and/or hydrostatic pressure to which the mixture is subjected.

This is an additional reason why it is advisable to develop mixing methods for mixing reinforcement/improvement particles with materials in a fluid state and, particularly, mixing methods for mixing reinforcement/improvement particles with materials in a fluid state comprising a matrix of starting material, whereby higher shear rates and/or higher hydrostatic pressures can be obtained with respect to the mixtures.

Moreover, industrial processes for mixing particles with materials in a fluid state, in which there is a need to achieve a good dispersion of the particles in the material (or materials) in a fluid state and to thereby prevent the appearance of agglomerations, are used in other sectors of the industry, besides those that have already been mentioned.

This is achieved by subjecting the mixture, formed by the material (or materials) in a fluid state and the suspended particles, to high shear rates (of the order of $10^4$-$10^5$ s$^{-1}$) and/or high hydrostatic pressure (of the order of (0.01-0.15 GPa). For this purpose, devices such as ball mills, calenders, homogenisers (for example, devices of the Rannie Gaulin® brand, marketed by the company AXFlow Holding AB), and dissolver devices (for example, devices of the Dispermat® brand, marketed by the company VMA Getzmann GmbH) are often used.

In processes for manufacturing paint, performing the mixing at high shear rates is particularly relevant to disperse the particles or nanoparticles used in manufacturing said paint which tend to agglomerate and/or to achieve modifications in said particles or nanoparticles, i.e., delamination, size reduction, etc.

Likewise, when a high shear rate and/or hydrostatic pressure is applied to a mixture formed by a material in a fluid state and suspended particles, fragmentation of said particles into other smaller particles (similarly to the fragmentation taking place in ball mills or calenders of the state of the art) may even occur if the conditions are suitable, resulting in a better mixing of the components.

Definitions

Throughout the present specification, the "shear rate" to which a material in a fluid state or a mixture (formed by a material in a fluid state and suspended particles) is subjected must be understood to mean the spatial gradient of velocity distribution, i.e., the magnitude of the variation of velocity of the material in a fluid state (or alternatively of the mixture) between two points very close to one another.

Likewise, the "hydrostatic pressure" to which a material in a fluid state or a mixture (formed by a material in a fluid state and suspended particles) is subjected must be understood to mean the compression to which the fluid material is subjected, and in the case of a mixture, said pressure also includes the compression to which the particles suspended in the fluid material are subjected.

Furthermore, a "kinematic pair" is a set of two mechanical elements which are in contact with one another with a specific contact force, with one furthermore being moved with respect to the other at a specific relative velocity. An upper kinematic pair is a kinematic pair in which the contact is theoretically a linear or point contact, also called a "Hertzian" contact such as, for example and in a non-limiting manner, the rolling element-race pair in the bearings, as well as those found in gears, cam-follower mechanisms, pin-on-disk tribometers, and ball-on-disk tribometers.

A lower kinematic pair is one in which contact occurs on a surface such as, for example, the shaft-bearing pair.

Evidently, in an upper kinematic pair, for contact forces that do not cause plastic deformation of the elements forming the pair, the contact that actually occurs between the two elements of the pair is not strictly a point or linear contact, but rather will be an elliptical contact (the ellipse having very short axes of the order of microns to hundreds of microns) or a rectangular contact (one of the sides of the rectangle having a very short length of the order of microns to hundreds of microns). Furthermore, when the elements forming the kinematic pair are in contact with a material in a fluid state in a system for the treatment of materials according to the present invention, as will be described in more detail below, a film of said material in a fluid state (or alternatively a film of the mixture formed by the material in a fluid state and the suspended particles) can be created between both elements of the pair, causing both elements to no longer be in contact. In other words, in two mechanical elements formally forming an upper kinematic pair, the actual contact will not be strictly a linear or point contact (or, in fact, there may be no contact at all), but the kinematic pair created by said elements are still formally called an "upper" or a "lower" pair.

Lastly, throughout the present specification, a "nanoparticle" must be understood to mean a particle in which at least one of its dimensions has a size between 0.1 and 100 nanometres.

BRIEF SUMMARY OF THE INVENTION

To solve the problems described in relation to the prior art, a first object of the present invention relates to a system for the treatment of materials, said materials being selected from between materials in a fluid state and particles suspended in a fluid material, characterised in that it comprises:

at least one upper kinematic pair equipped with two mechanical elements; said kinematic pair being in contact with a material in a fluid state or in contact with particles suspended in a fluid material;

motor means to generate a relative velocity between the mechanical elements of said kinematic pair, and tensioning means to subject said kinematic pair to a pre-set contact pressure.

It has been observed through experimentation that in the system for the treatment of materials of the present invention, by contacting the upper kinematic pair or pairs with a material in a fluid state and applying a sufficiently high force and relative rolling and/or sliding velocity between the mechanical elements of each pair, a hydrodynamic wedge is formed between said mechanical elements which may lead to said mechanical elements separating from one another, such that said material in a fluid state is capable of moving between the two mechanical elements of each pair, forming a film of very small thickness (of the order of ones, tens or hundreds of nanometres) between them.

Due to the force and relative velocity applied to the mechanical elements of the kinematic pairs, and to the hydrodynamic wedge created between them as a result of the presence of the material in a fluid state, said material in a fluid state is surprisingly subjected, in this case, to extremely high hydrodynamic pressures and shear rates (by way of example and in a non-limiting manner, of the order of 1-6 GPa and $10^6$-$10^9$ s$^{-1}$, respectively).

Without wishing to be bound in any case by theory, this is believed to be possible due to, among other factors, the hydrodynamic phenomena observed in lubricated Hertzian contacts. In fact, it is believed that in the system according to the invention, each upper kinematic pair would be subjected to a hydrodynamic lubrication regimen or limit by the material in a fluid state.

It has been verified that when the material in a fluid state, particularly if it is a polymer-type material or a polymer precursor material, is subjected to high pressures and/or shear rates by means of the treatment system according to the present invention, some of its physicochemical characteristics, such as, for example and in a non-limiting manner, the length or physical or chemical configuration of the monomers or of the polymer chains present in said material, may be modified. These modifications may lead to an improvement of some properties of the material or of the polymer resulting from the polymerisation of said precursor, such as rigidity, strength, fracture energy, electrical or thermal conductivity, without the need to add any reinforcement particle to that end.

In one embodiment of the invention, the system for the treatment of materials in a fluid state comprises upper kinematic pairs formed by at least one bearing equipped with rolling elements arranged between a moving ring and a fixed ring. Preferably, said bearing comprises a cage for separating the rolling elements.

In another embodiment of the invention, the system for the treatment of materials in a fluid state comprises at least one upper kinematic pair formed by a gear, a cam-follower mechanism, a chain-sprocket mechanism, a chain transmission, a belt transmission, a cable transmission, a pin-on-disk tribometer, or a ball-on-disk tribometer.

In a preferred embodiment of the invention, the upper kinematic pair, or alternatively, the upper kinematic pairs are housed in a chamber hermetically closed by a cover. In a more preferred embodiment of the invention, the closed chamber is equipped with conduits for the entry and/or exit of material in a fluid state.

Optionally, the chamber can furthermore be equipped with at least one bore for the controlled entry and/or exit of gas. Said bores allow creating controlled vacuums inside the chamber, or alternatively, introducing gases in said chamber with a controlled pressure and temperature and chemical composition.

Likewise, the chamber can be equipped with at least one window allowing the access of electromagnetic or acoustic radiation, for example, ultrasound, to the inside of the chamber.

The system for the treatment of materials according to the present invention can be optionally equipped with a coil through which a heat exchange fluid circulates. Said coil allows controlling the temperature of the material in a fluid state.

Said coil can be arranged inside the chamber, or alternatively, in the outer part of the chamber, in contact with the walls of the chamber. The heat exchange between the inside of the chamber and the coil occurs by convection and radiation.

Alternatively, instead of being equipped with a heat exchange coil, some embodiments of the system for the treatment of materials according to the present invention contemplate that the chamber is at least partially submerged in a fluid which is at a pre-set temperature.

In a preferred embodiment of the invention, the motor means comprise a motor connected to a transmission shaft and configured such that said motor is capable of transmitting an angular velocity to said transmission shaft, said shaft accessing the inside of the chamber through an opening provided in the cover body and the shaft being configured such that the shaft can transmit said angular velocity to the mechanical elements of the kinematic pair.

In the mentioned embodiment of the invention, said cover preferably further comprises a retainer and an O-ring. These additional components (retainer and O-ring) assure the tightness of the cover, preventing the material in a fluid state from being able to undesirably come out of the chamber through said cover and simultaneously preventing air or other gases from being able to undesirably enter said chamber.

In another preferred embodiment of the invention, the chamber comprises a chamber body for housing the material in a fluid state and a sleeve and a washer for fixing the kinematic pairs.

The tensioning means of the system according to the invention preferably comprise a fixed base on which the chamber is arranged and a moving platform movable by means of tightening devices so as to exert pressure on the cover of the chamber, the tightening devices being controlled by an actuating device.

The tensioning means are preferably furthermore equipped with:

speed reducers arranged between the tightening devices and the actuating device (said speed reducers allow amplifying the force which the tightening devices can exert for one and the same driving torque generated by the actuating device);

a cardan joint (said cardan joint allows synchronising the movement of the different tightening devices, causing all of them to move at the same speed), and guides for guiding the movement of the moving platform.

To measure the pressure exerted by the tightening devices on the cover of the chamber, the system for the treatment of materials according to the present invention can optionally be equipped with load cells preferably arranged between the chamber and the fixed base.

Optionally, it can also be equipped with at least of one thermocouple intended for measuring the temperature of the material in a fluid state.

Lastly, the system for the treatment of materials according to the present invention can be optionally equipped with vibrating means for subjecting the kinematic pair (or alternatively the kinematic pairs) to a vibratory movement. Said vibratory movement contributes to increasing the contact pressure to which the kinematic pairs are subjected.

A second object of the present invention relates to a method for the treatment of materials, selected from between materials in a fluid state and particles suspended in a fluid material, in a treatment system according to the first object of the invention, characterised in that it comprises the following steps:
  introducing in the system for the treatment of materials a material in a fluid state, such that at least one upper kinematic pair of the treatment system is in contact with said fluid material or in contact with said particles suspended in a fluid material;
  actuating the motor means to generate a pre-set relative velocity between the mechanical elements of said upper kinematic pair; and
  actuating the tensioning means to subject a kinematic pair to a pre-set contact pressure.

Likewise, in a particular embodiment of the method for the treatment of materials in a fluid state according to the invention, the material in a fluid state is a polymer material. More preferably, said polymer material contains polycarbonates, epoxy resin, bismaleimide, polyester, vinyl ester, phenolic resin, PEEK, ABS, PP, PE, urethane, or any combination thereof, including each one individually.

In another particular embodiment of the method for the treatment of materials according to the invention, the material in a fluid state is a polymer precursor, preferably a precursor of epoxy resin, bismaleimide, polyester, vinyl ester, phenolic resin, PEEK, ABS, PP, PE, urethane, or any combination thereof, including each one individually.

In another additional embodiment of the method for the treatment of materials according to the present invention, the suspended particles are made of graphite. Preferably, the purpose of this particular embodiment of the invention is to delaminate the graphite by means of the treatment system of the invention so as to obtain graphene.

As a result of the high force and high relative rolling and/or sliding velocity between the mechanical elements of the kinematic pairs which can be obtained by means of the system and method of the present invention, the obtained graphene may have higher levels of delamination and/or disentanglement and/or fragmentation of the particles, in comparison with the mixing methods known today.

A third object of the present invention relates to a mixing method for mixing a material in a fluid state with suspended particles in a system for the treatment of materials in a fluid state according to the first object of the invention, characterised in that it comprises the following steps:
  introducing in the treatment system a material in a fluid state furthermore containing suspended particles intended for being mixed with said fluid material, such that at least one upper kinematic pair of the treatment system is in contact with said fluid material containing suspended particles;
  actuating the motor means to generate a pre-set relative velocity between the mechanical elements of said upper kinematic pair; and
  actuating the tensioning means to subject said kinematic pair to a pre-set contact pressure.

Like in other embodiments of the present invention, in this mixing method, by contacting the upper kinematic pair or pairs with a mixture (formed by the material in a fluid state and the suspended particles) and applying a sufficiently high force and relative rolling and/or sliding velocity between the mechanical elements of each pair, a hydrodynamic wedge is formed between said mechanical elements which may lead to said mechanical elements separating from one another, such that the mixture is capable of moving between the two mechanical elements of each pair, forming a film of very small thickness (of the order of ones, tens or hundreds of nanometres) between them.

All this allows higher levels of delamination and/or disentanglement and/or dispersion and/or fragmentation of the particles and/or of adhesion thereof with the fluid material to be obtained in the mixing method according to the present invention, in comparison with the mixing methods known today.

In the mixing method according to the invention, the suspended particles are preferably reinforcement particles and more preferably, reinforcement nanoparticles. In an even more preferred embodiment of the invention, said reinforcement nanoparticles are carbon nanotubes and/or graphene or graphene oxide nanoparticles.

Likewise, in another preferred embodiment of the mixing method of the invention, the suspended particles are made of graphite.

Likewise, in a particular embodiment of the mixing method according to the invention, the material in a fluid state comprises a matrix of starting material, preferably a polymer material. More preferably, said polymer material contains polycarbonates, epoxy resin, bismaleimide, polyester, vinyl ester, phenolic resin, PEEK, ABS, PP, PE, urethane, or any combination thereof, including each one individually.

In another particular embodiment of the present mixing method, the material in a fluid state is a polymer precursor, preferably a precursor of epoxy resin, bismaleimide, polyester, vinyl ester, phenolic resin, PEEK, ABS, PP, PE, urethane, or any combination thereof, including each one individually.

In another particular embodiment of the mixing method, the material in a fluid state is a solvent.

In all the embodiments of the present invention, either the material in a fluid state or the mixture formed by the material in a fluid state and the suspended particles can be subjected to hydrodynamic pressures and shear rates that are significantly higher (by way of example and in a non-limiting manner, of the order of 1-6 GPa and $10^6$-$10^9$ s$^{-1}$, respectively), than those which can be obtained with the already known mixing systems and methods. This is achieved as a result of the high pressure and relative velocity applied to the mechanical elements of the kinematic pairs, and of the very small thickness of the hydrodynamic wedge created between said mechanical elements due to the presence of the mixture.

Likewise, the surface of the theoretical contact area and the thickness of the mixture film would depend on the rigidities of the load-supporting elements, on the relative velocity between the mechanical elements of each pair, and on the viscosity of the mixture of the material in a fluid state and the suspended particles. These parameters may be calculated, in a manner that is obvious for a one skilled in the art, from the hydrodynamic (HD), elastohydrodynamic (EHD), or thermoelastohydrodynamic (TEND) lubrication models, so in the mixing methods according to the invention, the shear rate and the hydrostatic pressure to which the mixture of fluid and suspended particles is subjected could be controlled independent of one another.

Next, to help better understand this specification and as an integral part thereof, a series of figures is attached in which several different embodiments of the invention are depicted in an illustrative and non-limiting manner.

NUMERICAL REFERENCES OF THE FIGURES (1) Fluid;
(2) Bearing;
(2a) Rolling element;
(2b) Moving ring;
(2c) Fixed ring;
(2d) Cage;
(3) Cover;
(3a) Cover body;
(3b) Retainer;
(3c) O-ring;
(4) Chamber;
(4a) Chamber body;
(4b) Sleeve;
(4c) Washer;
(4d) Bore;
(4e) Window for radiation;
(5) Motor means;
(5a) Motor;
(5b) Shaft
(5c) Protuberance of the shaft
(5d) Coupling for coupling the motor to the shaft;
(5e) Fixing element of the motor;
(6) Coil;
(7) Conduits for the entry/exit of material in a fluid state;
(8) Tensioning means;
(8a) Fixed base;
(8b) Moving platform;
(8c) Tightening devices;
(8d) Reducers;
(8e) Actuating device;
(8f) Cardan joint;
(8g) Guides for the moving platform;
(9a) Load cell;
(9b) Thermocouple;
(A) Section line;
($h_1$, $h_2$) Thicknesses of the films of material in a fluid state;
(p) Pressure;
(v) Relative velocity between the elements of the kinematic pair;
(w) Angular velocity.

DETAILED DESCRIPTION OF THE INVENTION

Throughout the present invention, as well as in the figures, the elements with equal or similar functions will be designated with the same numerical references.

Figure 1:
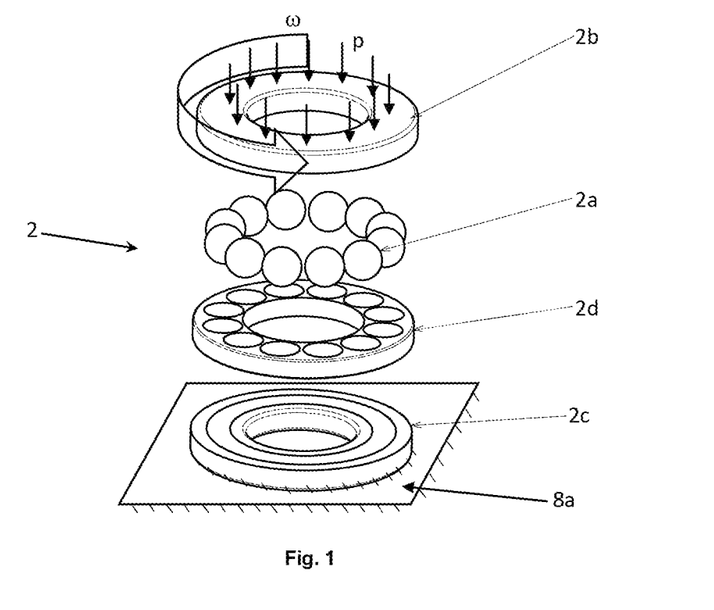
FIG. 1 is an ordered exploded view of a bearing equipped with upper kinematic pairs, for use in an embodiment of the treatment system of the present invention.

FIG. 1 shows an axial bearing 2 for use in an embodiment of a treatment system according to the present invention.

Said bearing 2 is supported on a fixed base 8a and comprises rolling elements 2a which, in this particular case, are steel spheres, arranged between a moving ring 2b and a fixed ring 2c. To assure the separation between the different rolling elements 2a, the bearing 2 is furthermore equipped with a cage 2d. This figure also schematically illustrates how, in a treatment system according to the invention, an angular velocity w is imparted on the moving ring 2b and a contact pressure p is exerted on the moving ring 2b which pushes said ring against the fixed ring 2c.

Figure 2:
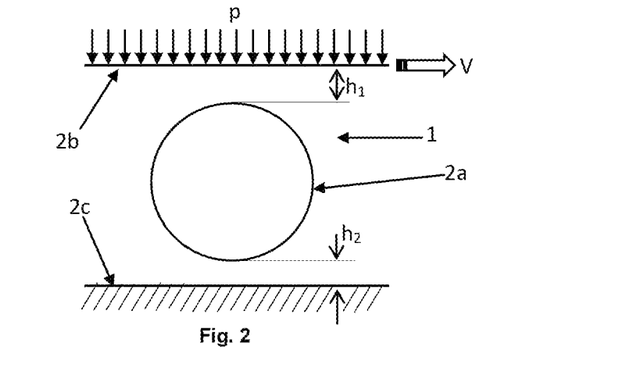
FIG. 2 is a schematic cross-sectional view illustrating the upper kinematic pairs created in a bearing according to FIG. 1 in a treatment system according to the present invention.

FIG. 2 schematically shows the upper kinematic pairs present in the bearing 2 which, within a treatment system according to the present invention, is placed in contact with a material in a fluid state 1 which can contain suspended particles intended for being mixed with said fluid.

This specific case, the mechanical elements are the rolling elements 2a, the moving ring 2b, and the fixed ring 2c. In fact, there are two upper kinematic pairs for each rolling element 2a present in the bearing 2: a first kinematic pair formed by the moving ring 2b and the rolling element 2a and a second kinematic pair formed by the rolling element 2a and the fixed ring 2c.

If the relative velocity v existing between the elements of the kinematic pairs and the contact pressure p to which the mechanical elements are subjected are suitable, a first film of fluid material 1, with a width $h_1$ is formed between the elements of the first kinematic pair and a second film of fluid material, with a width $h_2$, is formed between the elements of the second kinematic pair.

As will be obvious for one skilled in the art, in those cases in which the system for the treatment of materials according to the present invention is used for mixing a material in a fluid state 1 with suspended particles, the mixture of the material in a fluid state and the particles (and not only the material in a fluid state) will give rise to the first and second films, of widths $h_1$ and $h_2$, mentioned in the preceding paragraph.

Figure 3A:
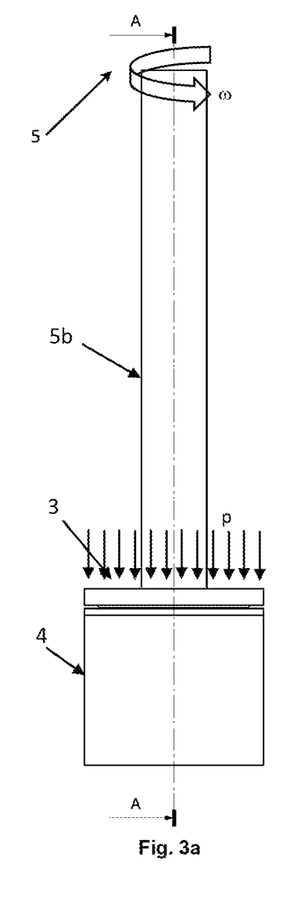
FIG. 3A is a side elevational view of the main components provided in a possible embodiment of the treatment system according to the present invention, based on bearings.
Figure 3B:
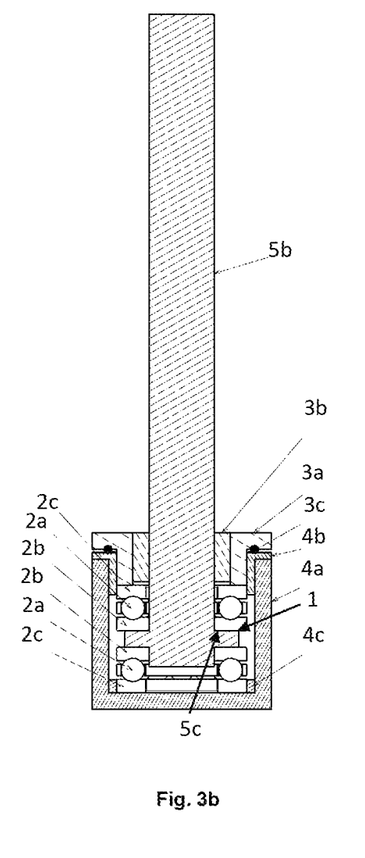
FIG. 3B is a cross-sectional view of FIG. 3A.
Figure 3C:
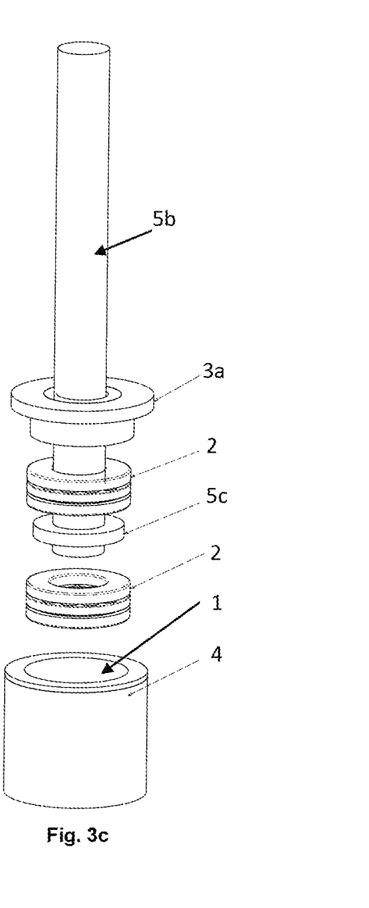
FIG. 3C is an ordered exploded view of the elements shown in FIG. 3A.

FIGS. 3A, 3B, and 3C show the main components provided in a treatment system according to the present invention. FIG. 3A is a side elevational view, whereas FIG. 3C is an ordered exploded view thereof. FIG. 3B is in turn a cross-sectional view along line A.

A chamber 4 housing therein, according to this particular embodiment of the treatment system of the invention, two axial bearings 2, each of which is equipped with rolling elements 2a, a moving ring 2b, and a fixed ring 2c, can be seen in said FIGS. 3A-3C.

The chamber 4 likewise houses the material in a fluid state 1. Obviously, in those cases in which the system for the treatment of materials according to the present invention is used for mixing a material in a fluid state 1 with suspended particles, the chamber 4 will house the mixture formed by the material in a fluid state and the suspended particles intended for being mixed with the material in a fluid state. Furthermore, said cover 4 comprises a body 4a, and a sleeve 4b and washer 4c allowing the radial fixing of the axial bearings 2.

Furthermore, the chamber 4 is equipped with a cover 3 subjected to a pressure p, exerted by pressure means (not seen in FIGS. 3A-3C). Said cover 3 comprises a body 3a equipped with a through hole allowing the passage of a shaft 5b. Said shaft 5b is part of the motor means 5 and is fitted with the moving rings 2b of each bearing, such that the angular velocity w generated by the motor means 5 is transmitted without friction to the moving rings 2b of each bearing 2.

In this particular embodiment of the invention, the shaft 5b is equipped with a protuberance 5c which maximises contact between said shaft 5b and the moving rings 2b so as to prevent relative movement, and therefore friction, between same.

The cover 3 is subjected to the pressure p generated by tensioning means (not seen in FIGS. 3A-3C). Said pressure p is transmitted to the mechanical elements of the bearings 2 through the body 3a of the cover 3. Moreover, in this particular embodiment of the invention, the cover 3 is also equipped with a retainer 3b and an O-ring 3c which prevent the material in a fluid state 1 (or, as the case may be, the mixture formed by the material in a fluid state 1 and the suspended particles) from being able to seep out of the chamber 4 through the through hole present in the body 3a of the cover 3. The retainer 3b and the O-ring 3c also prevent the entry or exit of air or other gases with respect to the inside of the chamber 4.

Figure 4:
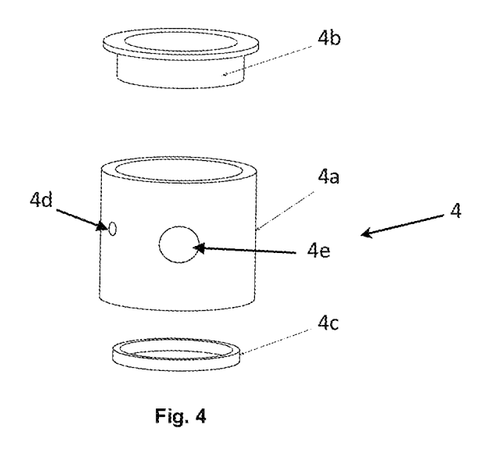
FIG. 4 is an ordered exploded view of the chamber provided in an embodiment of the treatment system according to the present invention.

FIG. 4 shows an ordered exploded view of a chamber 4 for use in a treatment system according to the present invention. In this particular embodiment of the invention, in addition to the body 4a, the sleeve 4b, and the washer 4c, the chamber 4 is also equipped with a bore 4d for the controlled entry and/or exit of gas, as well as a window 4e, allowing the access of electromagnetic or acoustic radiation, for example and in a non-limiting manner, ultrasound, to the inside of the chamber.

In those cases in which the system for the treatment of materials according to the present invention is used for mixing a material in a fluid state 1 with the suspended particles, the electromagnetic and/or acoustic radiations mentioned in the preceding paragraph are normally used to improve the dispersion of the particles in the fluid material and if the particles are nanoparticles, to furthermore improve the adhesion between said nanoparticles and the fluid material 1.

Figure 5:
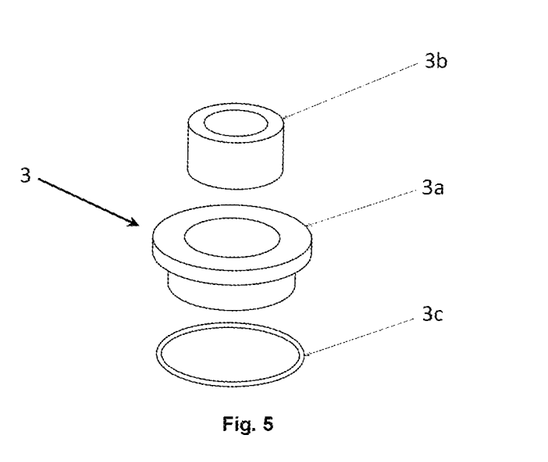
FIG. 5 is an ordered exploded view of the cover of the chamber, provided in an embodiment of the treatment system according to the present invention.

FIG. 5 shows an ordered exploded view of the cover 3 described in FIGS. 3A to 3C. As seen above, said cover 3 comprises the body 3a, the retainer 3b, and the O-ring 3c.

Figure 6:
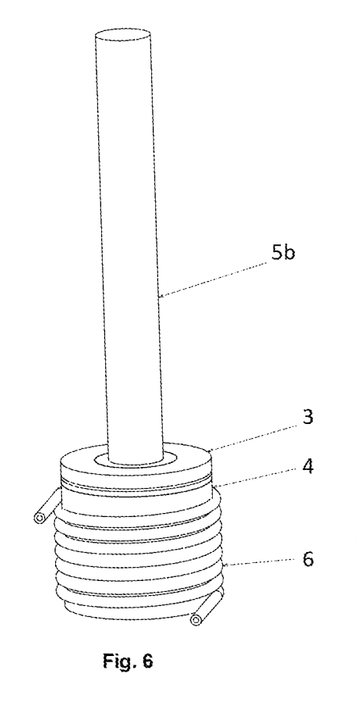
FIGS. 6 and 7 are perspective views illustrating additional elements of the treatment system in two possible embodiments of the treatment system according to the present invention.

FIG. 6 shows a particular embodiment of a treatment system according to the present invention which further comprises a coil 6, in addition to other components already explained in relation to other preceding figures. Said coil allows controlling the temperature of the fluid material 1, or as the case maybe, of the mixture formed by the fluid material 1 and the suspended particles.

Figure 7:
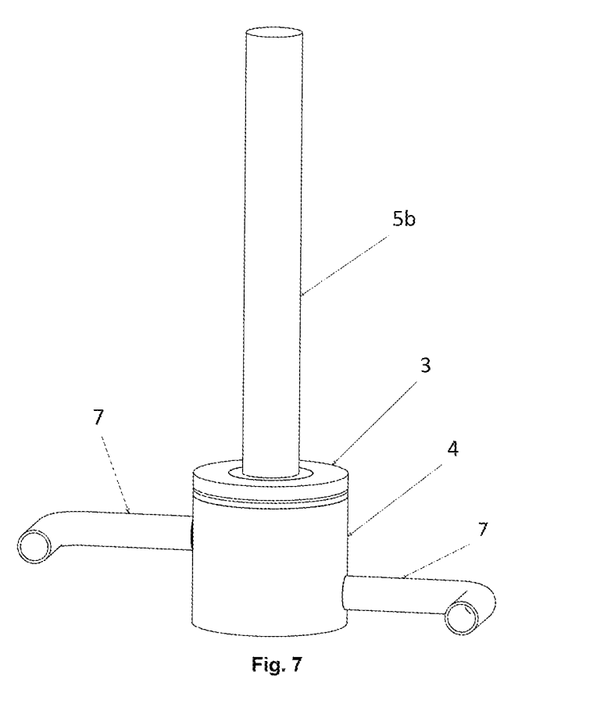

Likewise, FIG. 7 shows a particular embodiment of a treatment system according to the present invention which further comprises conduits 7 allowing the entry and/or exit of the fluid material 1, or as the case maybe, of the mixture formed by the fluid material 1 and the suspended particles, with respect to the inside of the chamber, in addition to other components already explained in relation to other preceding figures.

Figure 8:
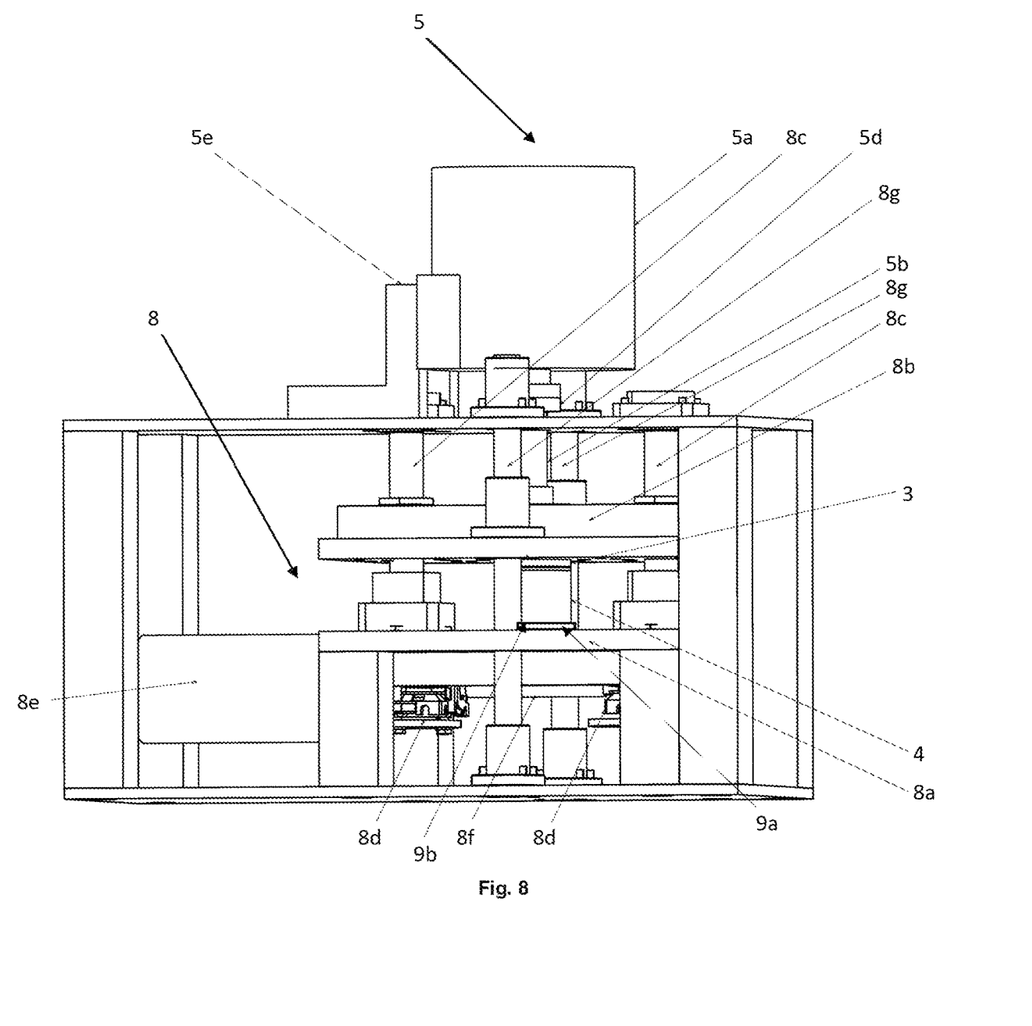
FIG. 8 is a side elevational view of a complete embodiment of the treatment system according to the present invention.

Lastly, FIG. 8 shows a particular embodiment of a complete treatment system according to the present invention. In the particular embodiment of the invention shown in this figure, the motor means 5 comprise a motor 5a connected to the shaft 5b through a coupling 5d. Therefore, when the motor 5a is actuated, the resulting driving torque is transmitted to the shaft 5b, such that said shaft 5b is capable of rotating at an angular velocity w (schematically illustrated in FIGS. 1 and 3A).

Furthermore, in this particular embodiment of the invention, the chamber 4 containing the fluid material 1, or as the case maybe, the mixture of fluid material 1 and suspended particles, is arranged on the fixed base 8a. The motor 5a is fixed to said fixed base 8a by means of a fixing element 5e.

Moreover, in this particular embodiment of the invention, the pressure means 8 comprise, in addition to the fixed base 8a, a moving platform 8b which is capable of moving as a result of the action of an actuating device 8e (in this embodiment, a motor) which causes the rotation of tightening devices 8c which, in this embodiment of the invention, are screws coupled to threaded through portions provided in the moving platform 8b. As a result of this movement, the moving platform 8b can exert pressure on the cover 3 of the chamber 4, and said pressure is in turn transmitted by contact to the mechanical elements.

Optionally, speed reducers 8d can be arranged between the screws 8c and the actuating device 8e. Said reducers 8d allow amplifying the force which the screw can exert for one same pair of the actuating device 8e. Preferably, there are also provided a cardan joint 8f which allows equalising the rotating speed of the reducers 8d and guides 8g which allow the moving platform 8b to move parallel to the fixed base 8a.

There are also provided in this embodiment of the invention at least one load cell 9a intended for measuring the compressive force applied on the cover 3 by the tensioning means and at least one thermocouple 9b intended for measuring the temperature of the fluid material 1, or as the case maybe, of the mixture formed by the fluid material 1 and the suspended particles intended for being mixed with said fluid material 1.

The present invention is in no way limited to the embodiments herein disclosed. For a person skilled in the art, other possible different embodiments of this invention will be evident in light of the present description. As a result, the scope of protection of the present invention is exclusively defined by the claims that follow.

The invention claimed is:

1. A system for treatment of materials, selected from between materials in a fluid state and particles suspended in a fluid material, comprising:
  at least one upper kinematic pair equipped with two mechanical elements, said upper kinematic pair being in contact with a material in a fluid state or in contact with particles suspended in a fluid material;
  a motor to generate a pre-set relative velocity (v) between the mechanical elements of said kinematic pair;

tensioning means configured to subject said upper kinematic pair to a pre-set contact pressure (p), the tensioning means comprising a fixed base on which a chamber is arranged and a moving platform movable by tightening devices so as to exert pressure on a cover of the chamber, said tightening devices being controlled by an actuating device; and the upper kinematic pair is formed by at least one bearing with rolling elements arranged between a moving ring and a fixed ring, wherein the tensioning means further comprises:
speed reducers arranged between the tightening devices and the actuating device;
a cardan joint; and
guides for guiding a movement of the moving platform.

2. The system according to claim 1, further comprising:
said upper kinematic pair being housed in a chamber hermetically closed by the cover, and
wherein the pre-set relative velocity (v) subjects the materials to a shear rate between $10^6$-$10^9$ s$^{-1}$.

3. The system according to claim 1, wherein the at least one bearing further comprises:
a cage for separating the rolling elements.

4. The system according to claim 1, wherein the chamber further comprises:
conduits for an entry or an exit of materials in a fluid state.

5. The system according to claim 1, wherein the chamber further comprises:
at least one bore for a controlled entry or exit of a gas.

6. The system according to claim 1, further comprising:
a coil through which a heat exchange fluid circulates.

7. The system according to claim 1, further comprising:
at least one window allowing an electromagnetic radiation or an acoustic radiation inside of the chamber.

8. The system according to claim 1, further comprising:
a transmission shaft connected to the motor, such that said motor is configured to transmit an angular velocity (w) to said transmission shaft, said transmission shaft accessing an inside of the chamber through an opening provided in a cover body of the cover, such that the transmission shaft can transmit said angular velocity (w) to one of the elements of the upper kinematic pair.

9. The system according to claim 1, wherein the cover further comprises:
a retainer and an O-ring.

10. The system according to claim 1, wherein the chamber further comprises:
a chamber body for housing the material in a fluid state, and a sleeve and a washer for fixing the upper kinematic pair.

11. The system according to claim 1, further comprising:
a vibrating means to subject the upper kinematic pair to a vibratory movement.

* * * * *